United States Patent
Lee et al.

(10) Patent No.: US 10,222,659 B2
(45) Date of Patent: Mar. 5, 2019

(54) LIQUID CRYSTAL DISPLAY AND EXPOSURE MASK FOR MANUFACTURING THE SAME

(71) Applicant: Samsung Display Co. Ltd., Yongin-si (KR)

(72) Inventors: Se Hyun Lee, Seoul (KR); Cheol Shin, Hwaseong-si (KR); Hak Sun Chang, Yongin-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 168 days.

(21) Appl. No.: 15/178,326

(22) Filed: Jun. 9, 2016

(65) Prior Publication Data

US 2016/0377941 A1   Dec. 29, 2016

(30) Foreign Application Priority Data

Jun. 24, 2015   (KR) ........................ 10-2015-0089558

(51) Int. Cl.
*G03F 1/50*   (2012.01)
*G02F 1/1337*   (2006.01)
*G02F 1/1343*   (2006.01)

(52) U.S. Cl.
CPC .. *G02F 1/134309* (2013.01); *G02F 1/133707* (2013.01); *G03F 1/50* (2013.01)

(58) Field of Classification Search
CPC . G02F 1/134309; G02F 1/133707; G03F 1/50
See application file for complete search history.

(56) References Cited

U.S. PATENT DOCUMENTS

| | | | |
|---|---|---|---|
| 2012/0044446 A1* | 2/2012 | Hara | G02F 1/134309 349/139 |
| 2013/0107185 A1 | 5/2013 | Chen et al. | |
| 2013/0314640 A1* | 11/2013 | Kang | G02F 1/1337 349/61 |
| 2014/0267994 A1 | 9/2014 | Ryu et al. | |

FOREIGN PATENT DOCUMENTS

| | | |
|---|---|---|
| JP | 2010139825 | 6/2010 |
| KR | 1020080096943 | 11/2008 |
| KR | 1020160027333 | 3/2016 |

* cited by examiner

*Primary Examiner* — Lucy P Chien
(74) *Attorney, Agent, or Firm* — Cantor Colburn LLP

(57) ABSTRACT

A liquid crystal display includes a substrate, and a pixel electrode disposed on the substrate. The pixel electrode includes a plurality of micro-branches which are spaced apart from each other and extend side by side with each other, where a micro-slit is defined between the micro-branches, and a stem part which is connected to each of the micro-branches, where an indentation pattern is defined by a cutout portion extending into the stem part, and at least one of two points connecting the indentation pattern and the micro-slit is located on a slit boundary line at which the micro-slit and the stem part meet each other.

16 Claims, 23 Drawing Sheets

LIQUID CRYSTAL DISPLAY AND EXPOSURE MASK FOR MANUFACTURING THE SAME

This application claims priority to Korean Patent Application No. 10-2015-0089558 filed on Jun. 24, 2015, and all the benefits accruing therefrom under 35 U.S.C. § 119, the content of which in its entirety is herein incorporated by reference.

BACKGROUND

1. Field

Exemplary embodiment of the invention relate to a liquid crystal display ("LCD") and an exposure mask for manufacturing the LCD.

2. Description of the Related Art

Liquid crystal displays ("LCD"s) are one of the most widely used types of flat panel display. Generally, an LCD includes electric field generating electrodes and a liquid crystal layer interposed between these electrodes. The LCD generates an electric field in the liquid crystal layer by applying voltages to the electric field generating electrodes, and the alignment direction of liquid crystal molecules of the liquid crystal layer is thereby determined to control polarization of incident light. As a result, an image is displayed on the LCD. The transmittance of the LCD may increase as the liquid crystal molecules of the liquid crystal layer are controlled better.

The LCD typically includes a pixel electrode having a predetermined pattern. The visibility, transmittance, etc. of the LCD may be mainly determined by the design or position of the pixel electrode.

SUMMARY

In a liquid crystal display ("LCD") where a pixel electrode thereof has a predetermined pattern, there may be an area in which the pattern of the pixel electrode is rapidly changed. In such an area, it may be difficult to control the liquid crystal molecules. Therefore, the pixel electrode is desired to be designed in a way such that the control over the liquid crystal molecules even in this area can be guaranteed.

Embodiments of the invention relate to an LCD having improved control over liquid crystal molecules.

Embodiments of the invention relate to an exposure mask for manufacturing an LCD having improved control over liquid crystal molecules.

According to an exemplary embodiment of the invention, a liquid crystal display includes a pixel electrode disposed on the substrate. In such an embodiment, the pixel electrode includes a plurality of micro-branches which are separated from each other and extend side by side with each other, where a micro-slit is defined between the micro-branches, and a stem part which is connected to each of the micro-branches, wherein an indentation pattern is defined by a cutout portion cut into the stem part, and at least one of two points connecting the indentation pattern and the micro-slit is located on a slit boundary line at which the micro-slit and the stem part meet each other.

In an exemplary embodiment, a maximum width of the indentation pattern, which is a length of a straight line connecting two points located farthest from each other from among points located on an outer side of the indentation pattern, may be smaller than a width of the micro-slit.

In an exemplary embodiment, the indentation pattern may include a first sub-indentation pattern and a second sub-indentation pattern, where each of the first and second sub-indentation patterns may be cut into the stem part or a micro-branch.

In an exemplary embodiment, each of the first and second sub-indentation patterns may have a substantially parallelogrammatic shape.

In an exemplary embodiment, the first sub-indentation pattern may extend parallel to the slit boundary line and be cut into the stem part and the micro-branch, and the second sub-indentation pattern may extend parallel to a direction in which the micro-slit extends and be cut into the stem part.

In an exemplary embodiment, the indentation pattern may be semi-circular.

In an exemplary embodiment, the micro-slit may has a first angle and a second angle which are two internal angles thereof formed with respect to the stem part, wherein the first angle may be an obtuse angle, the second angle may be an acute angle, and the indentation pattern may be disposed adjacent to a vertex at which the first angle is formed.

In an exemplary embodiment, the pixel electrode may include a plurality of domains, where a direction in which the micro-branches and the micro-slit extend is different in each of the domains.

In an exemplary embodiment, a direction in which the stem part extends and a direction in which the slit boundary line extends may not be parallel to each other.

In an exemplary embodiment, an angle formed by the direction in which the stem part extends and the direction in which the slit boundary line extends may be greater than about 10 degrees and smaller than about 15 degrees.

In an exemplary embodiment, the outer side of the indentation pattern may include a single curve.

According to another exemplary embodiment of the invention, an exposure mask includes a blocking area which blocks incident light, a transmitting area which is adjacent to the blocking area and transmits the incident light therethrough. In such an embodiment, the transmitting area includes a plurality of mask micro-branches which are spaced apart from each other and extend side by side with each other, a mask micro-slit between the mask micro-branches, a mask stem part which is connected to each of the mask micro-branches, and a mask indentation pattern cut into the mask stem part, and at least one of two points connecting the mask indentation pattern and the mask micro-slit is located on a mask slit boundary line at which the mask micro-slit and the mask stem part meet each other.

In an exemplary embodiment, a maximum width of the mask indentation pattern, which is a length of a straight line connecting two points located farthest from each other from among points located on an outer side of the mask indentation pattern, may be smaller than a width of the mask micro-slit.

In an exemplary embodiment, the mask indentation pattern may include a first sub-mask indentation pattern and a second sub-mask indentation pattern, where each of the first and second sub-mask indentation patterns may be cut into the mask stem part or a mask micro-branch.

In an exemplary embodiment, each of the first and second sub-mask indentation patterns may have a substantially parallelogrammatic shape.

In an exemplary embodiment, the first sub-mask indentation pattern may extend parallel to the mask slit boundary line and be cut into the mask stem part and the mask micro-branch, and the second sub-mask indentation pattern may extend parallel to a direction in which the mask micro-slit extends and be cut into the mask stem part.

In an exemplary embodiment, the mask micro-slit may have a first angle and a second angle which are two internal angles thereof formed with respect to the mask stem part, where the first angle may be an obtuse angle, the second angle may be an acute angle, and the mask indentation pattern may be disposed adjacent to a vertex at which the first angle is formed.

In an exemplary embodiment, a direction in which the mask micro-branches and the mask micro-slit extend may be different in each of the domains.

In an exemplary embodiment, a direction in which the mask stem part extends and a direction in which the mask slit boundary line extends may not be parallel to each other.

In an exemplary embodiment, an angle formed by the direction in which the mask stem part extends and the direction in which the mask slit boundary line extends may be greater than about 10 degrees and smaller than about 15 degrees.

BRIEF DESCRIPTION OF THE DRAWINGS

The above and other features of the invention will become more apparent by describing in detail exemplary embodiments thereof with reference to the attached drawings, in which.

DETAILED DESCRIPTION

Figure 1:
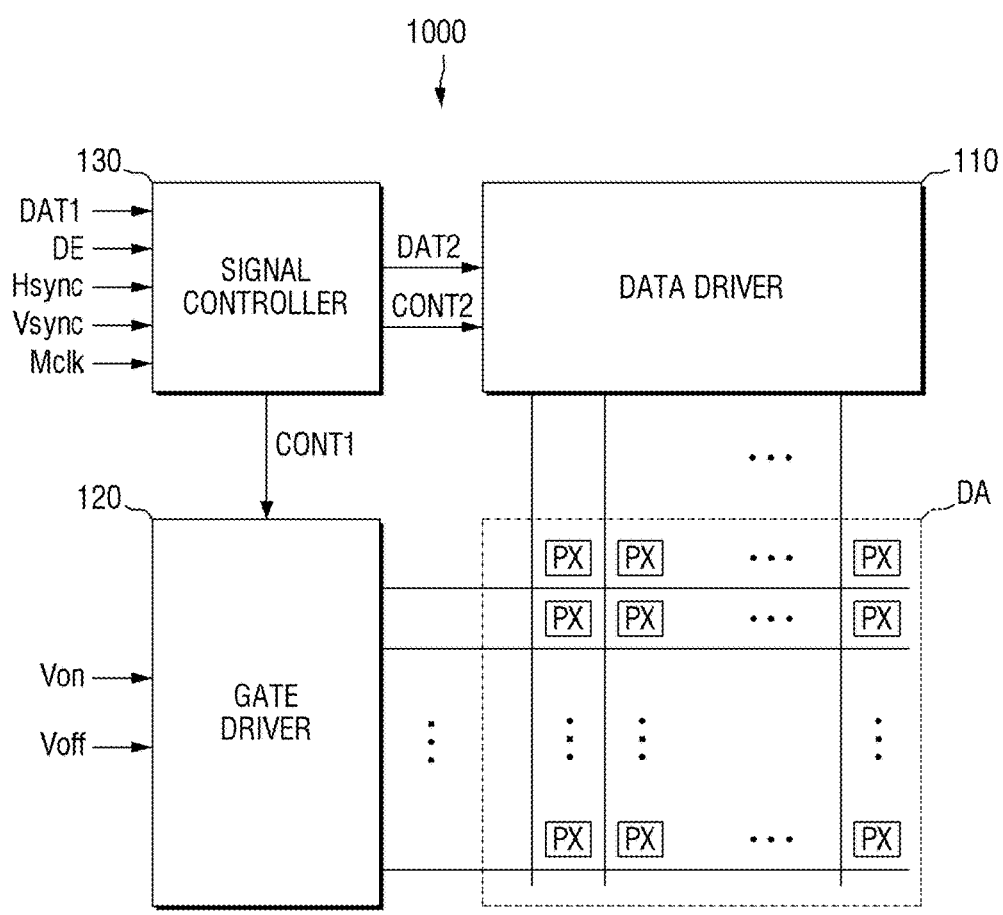
FIG. 1 is a block diagram of a liquid crystal display ("LCD") according to an embodiment of the invention.

Advantages and features of the invention and methods of accomplishing the same may be understood more readily by reference to the following detailed description of preferred embodiments and the accompanying drawings. The invention may, however, be embodied in many different forms and should not be construed as being limited to the embodiments set forth herein. Rather, these embodiments are provided so that this disclosure will be thorough and complete and will fully convey the concept of the invention to those skilled in the art, and the invention will only be defined by the appended claims. Like reference numerals refer to like elements throughout the specification.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, these embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which the invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Exemplary embodiments of the invention will hereinafter be described with reference to the accompanying drawings.

FIG. 1 is a block diagram of a liquid crystal display ("LCD") 1000 according to an embodiment of the invention.

Referring to FIG. 1, an exemplary embodiment of the LCD 1000 includes a gate driver 120, a data driver 110, a signal controller 130, and a display area DA.

The display area DA includes a plurality of pixels PX. The pixels PX may be arranged substantially in a matrix form or pattern. The display area DA may include a plurality of gate lines GL extending along a first wiring direction and a plurality of data lines DL extending along a second wiring direction intersecting the first wiring direction.

The gate lines GL receive gate signals from the gate driver 120, and the data lines DL receive data signals from the data driver 110. Each of the pixels PX may be disposed at an intersection of a gate line GL and a data line DL.

Each pixel PX may display one of primary colors to produce a desired color. In one exemplary embodiment, for example, the primary colors may include red, green, and blue. Herein, a pixel which displays red will be referred to as a red pixel, a pixel which displays green will be referred to as a green pixel, and a pixel which displays blue will be referred to as a blue pixel. In such an embodiment, any color other than red, green and blue may be displayed by combining the red, green and blue pixels together and adjusting the brightness of each of the red, green and blue pixels.

The red pixel, the green pixel and the blue pixel may be alternately arranged along a column direction. However, the arrangement direction of the red pixel, the green pixel and the blue pixel is not limited to the column direction, and alternatively, the red pixel, the green pixel and the blue pixel may be alternately arranged along a row direction. Alternatively, the three pixels may be placed at locations respectively corresponding to three vertices of a triangle. The red pixel, the green pixel and the blue pixel may also be arranged in various other ways, and the arrangement of the red pixel, the green pixel and the blue pixel is not limited to the above arrangement structures.

The signal controller 130 receives various signals from an external source and controls the gate driver 120 and the data driver 110 using the received signals. In one exemplary embodiment, for example, the signal controller 130 may receive from the external source first image data DAT1 and input control signals for controlling the display of the first image data DAT1. Then, the signal controller 130 may output a gate driver control signal CONT1, a data driver control signal CONT2, and second image data DAT2.

The first image data DAT1 may include luminance information of each pixel PX of the display area DA. The luminance information may have a predetermined number of gray values corresponding to grayscale levels, such as 1024 (=210), 256 (=28), or 64 (=26) gray values, for example. However, the invention is not limited thereto, and the luminance information may also have a different number of gray values from those described above. The input first image data DAT1 may be divided into frames.

The input control signals input to the signal controller 130 may include, for example, a vertical synchronization signal Vsync, a horizontal synchronization signal Hsync, a main clock Mclk, and a data enable signal DE. However, the input control signals are not limited thereto, and other types of signals may further be input to the signal controller 130.

The gate driver control signal CONT1 may be generated by the signal controller 130 to control the operation of the gate driver 120. The gate driver control signal CONT1 may include a scan start signal and a clock signal. However, the invention is not limited thereto, and the gate driver control signal CONT1 may further include other signals. The gate driver 120 may generate a plurality of gate signals that may activate the pixels PX of the display area DA, in response to the gate driver control signal CONT1 and based on a gate-on voltage Von and a gate-off voltage Voff, and transmit the generated gate signals to corresponding ones of the gate lines GL.

The data driver control signal CONT2 may be generated by the signal controller 130 to control the operation of the data driver 110. The data driver 110 may generate a plurality of data signals according to the data driver control signal CONT2 and transmit the generated data signals to corresponding ones of the data lines DL.

Figure 2:
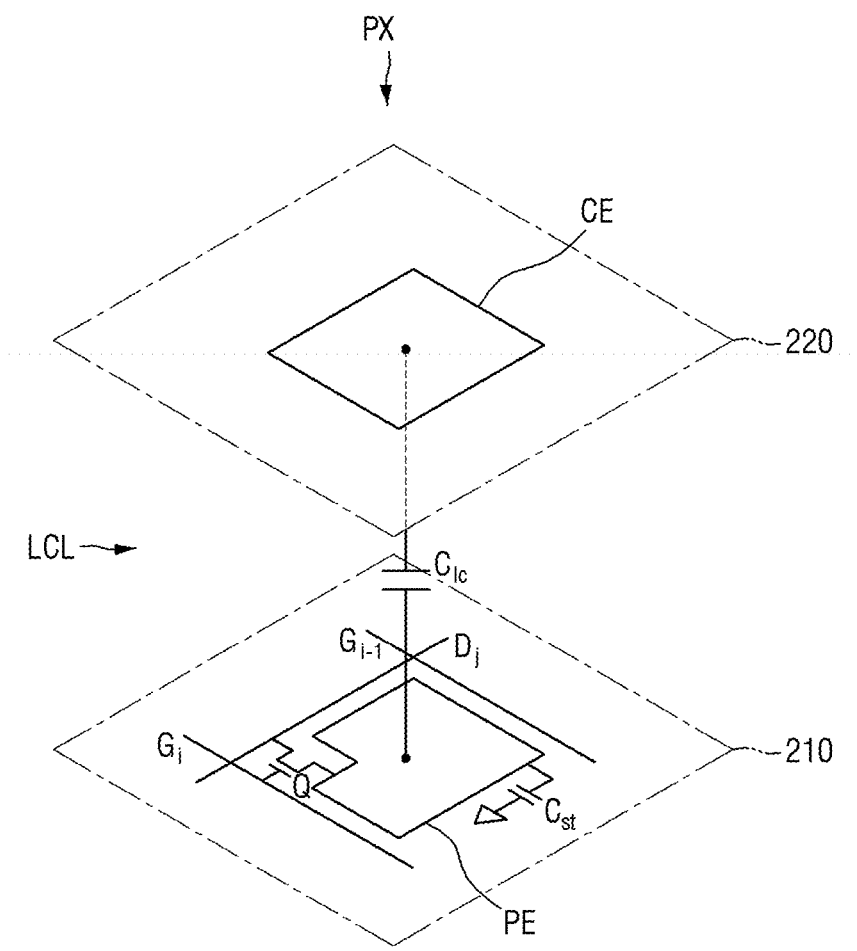
FIG. 2 is a schematic diagram illustrating the structure of a pixel of FIG. 1.

FIG. 2 is a schematic diagram illustrating the structure of a pixel PX of FIG. 1.

Referring to FIG. 2, in an exemplary embodiment, the pixel PX may include an upper substrate 220, a lower substrate 210, and a liquid crystal layer LCL disposed in a space between the upper substrate 220 and the lower substrate 210. In such an embodiment, the pixel PX may include a switching device Q connected to a gate line GL and a data line DL, and the switching device Q may be connected to a pixel electrode PE.

The pixel electrode PE may define a liquid crystal capacitor Clc by interacting with a common electrode CE disposed on the upper substrate 220. In such an embodiment, the pixel electrode PE may include a storage capacitor Cst. In some embodiments, the storage capacitor Cst may be omitted.

The switching device Q may be a three-terminal device, e.g., a thin-film transistor ("TFT") included in the lower substrate 210. The switching device Q may have a control terminal connected to the gate line Gi, an input terminal connected to the data line Dj, and an output terminal connected to the liquid crystal capacitor Clc and the storage capacitor Cst.

Two terminals of the liquid crystal capacitor Clc may be defined by the pixel electrode PE of the lower substrate 210 and the common electrode CE of the upper substrate 220, respectively. The liquid crystal layer LCL between the pixel electrode PE and the common electrode CE may function as a dielectric. The pixel electrode PE may be connected to the switching device Q, and the common electrode CE may be disposed on and to cover the whole surface of the upper substrate 220, and receive a common voltage. The dispositions and structures of the common electrode CE and the pixel electrode PE are not limited to those illustrated in FIG. 2. Alternatively, the common electrode CE may be provided on the lower substrate 210. In such an embodiment, at least one of the pixel electrode PE and the common electrode CE may include a pattern for controlling the liquid crystal layer LCL. The pattern of the pixel electrode PE and the common electrode CE will be described in detail later.

The storage capacitor Cst, which plays an auxiliary role of the liquid crystal capacitor Clc, may be defined by a signal line (not illustrated) and the pixel electrode PE disposed on the lower substrate 210, which overlap each other with an insulator interposed therebetween. A predetermined voltage such as the common voltage may be provided to the signal line (not illustrated). Alternatively, the storage capacitor Cst may be defined by the pixel electrode PE that overlaps a previous gate line Gi-1 disposed immediately above the current gate line Gi using the insulator as a medium.

As described above with reference to FIG. 1, each pixel PX may display one of the primary colors to produce a desired color. To produce a desired color, a color filter (not illustrated) may be provided on at least one of the upper substrate 220 and the lower substrate 210.

Figure 3:
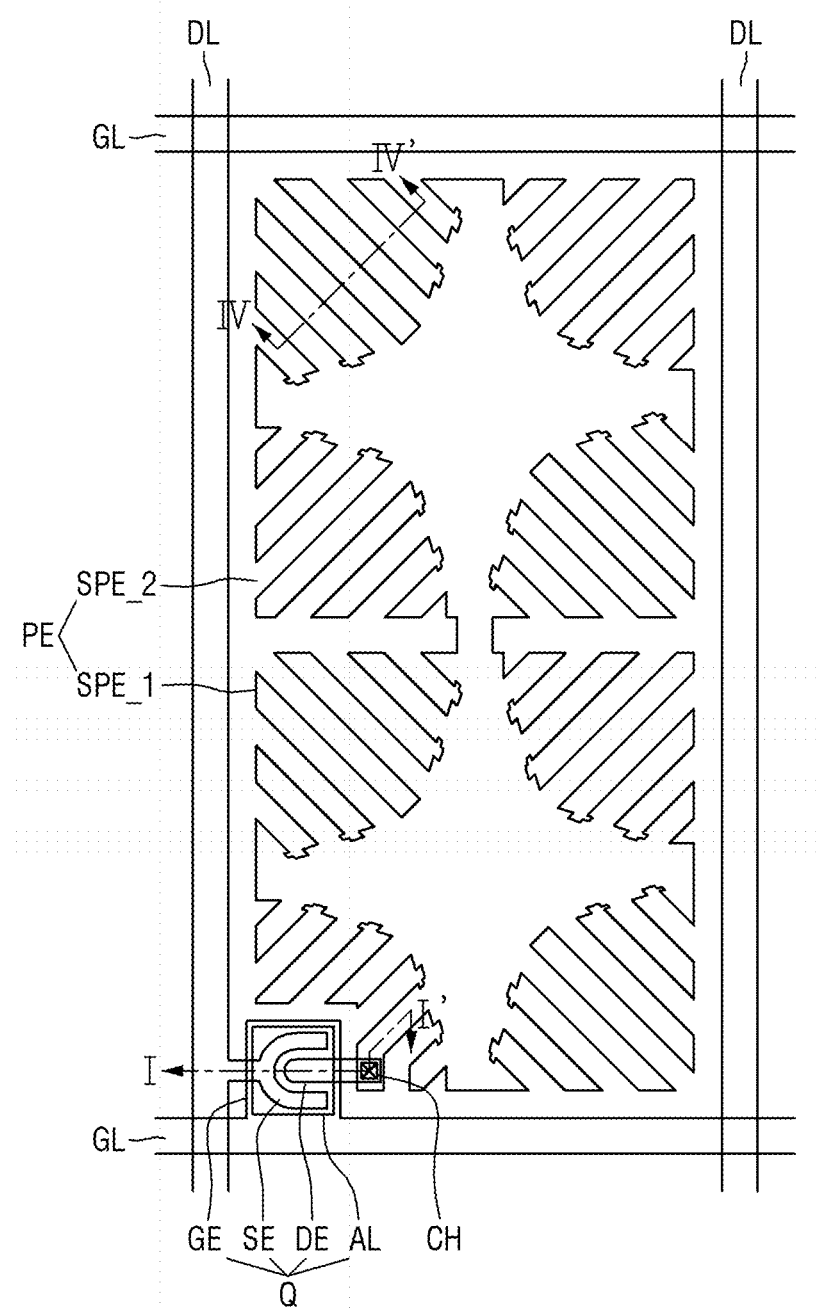
FIG. 3 is a plan view of a pixel of the LCD illustrated in FIG. 1.
Figure 4:
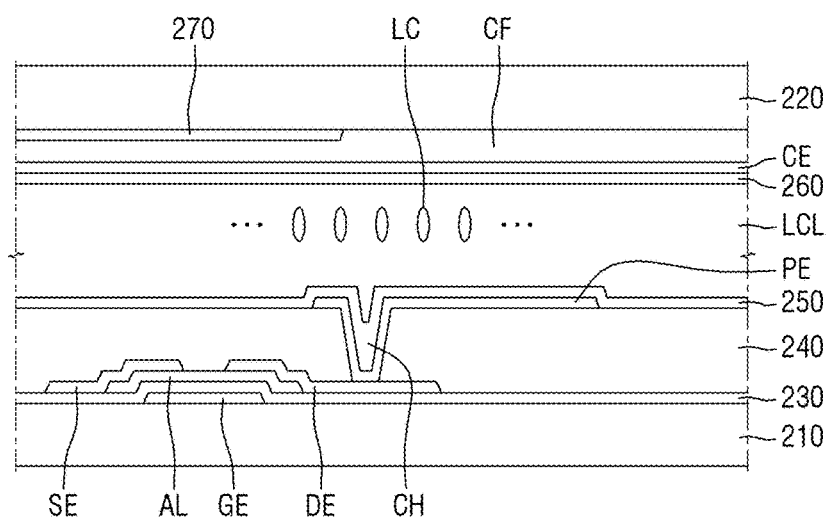
FIG. 4 is a cross-sectional view taken along line I-I' of FIG. 3.

FIG. 3 is a plan view of a pixel PX of the LCD 1000 illustrated in FIG. 1. FIG. 4 is a cross-sectional view taken along line I-I' of FIG. 3.

Referring to FIGS. 3 and 4, an exemplary embodiment of the LCD 1000 includes a lower panel and an upper panel, which face each other, and a liquid crystal layer LCL disposed between the lower and upper panels.

The lower panel may include a first insulating substrate 210. The lower panel may include a gate line GL and a gate electrode GE connected to the gate line GL, which are disposed on the first insulating substrate 210. The lower panel may include a gate insulating layer 230 disposed on the gate line GL and the gate electrode GE.

The lower panel may include a semiconductor layer AL disposed on the gate insulating layer 230. The semiconductor layer AL may overlap the gate electrode GE. Although not illustrated in the drawings, an ohmic contact member may be disposed on the semiconductor layer AL. The semiconductor layer AL may be made of a semiconductor material such as amorphous silicon or oxide semiconductor to pass or block an electric current according to a voltage provided to the gate electrode GE. The ohmic contact member may be made of a semiconductor material doped with an impurity and form an ohmic contact between each of a source electrode SE and a drain electrode DE thereon and the semiconductor layer AL thereunder.

The lower panel may include a data line DL, the source electrode SE and the drain electrode DE, which are disposed on the semiconductor layer AL and the gate insulating layer 230. The source electrode SE is connected to the data line DL and disposed on the semiconductor layer AL. The drain electrode DE is disposed on the semiconductor layer AL and separated from the source electrode SE. When a channel is formed in the semiconductor layer AL in response to a gate-on voltage applied to the gate electrode GE, a data voltage applied to the data line DL may be provided to the drain electrode DE via the source electrode SE and the semiconductor layer AL.

The lower panel may include a passivation layer 240 disposed on the data line DL, the source electrode SE and the drain electrode DE. The passivation layer 240 may include an inorganic insulating material or an organic insulating material. The passivation layer 240 may a multilayer structure defined by a stack of two or more layers. In one exemplary embodiment, for example, the passivation layer 240 may include a first passivation layer (not illustrated) including an inorganic insulating material, and a second passivation layer (not illustrated) including an organic insulating material and disposed on the first passivation layer.

A contact hole CH which exposes part of the drain electrode DE of a switching device Q may be defined in the passivation layer 240. The drain electrode DE may be physically and electrically connected to a pixel electrode PE by the contact hole CH.

The lower panel may include a lower alignment layer 240 disposed on the pixel electrode PE. The lower alignment layer 250 may be a vertical alignment layer. The lower alignment layer 250 may allow a liquid crystal molecule in the liquid crystal layer LCL to have a predetermined pretilt angle. In such an embodiment, in an initial state in which no electric field is generated between the pixel electrode PE and a common electrode CE, liquid crystal molecules LC located on the lower alignment layer 250 may pretilt at an angle of about 1 degree to about 10 degrees to a direction perpendicular to the lower alignment layer 250.

The upper panel may include a second insulating substrate 220. The upper panel may include a blocking member 270 disposed on (under) the second insulating substrate 220. The blocking member 270 may block light and may be in a lattice pattern. The blocking member 270 may overlap an area excluding an area in which the pixel electrode PE is disposed, thereby preventing the leakage of light.

The upper panel may include a color filter CF disposed on the second insulating substrate 220 and the blocking member 270. The color filter CF may transmit a particular wavelength band of incident light and block the other wavelength bands, so that light emerging from the color filter CF has a particular color.

In an alternative exemplary embodiment, the blocking member 270 and the color filter CF may be disposed on the second insulating substrate 220. In such an embodiment, although not illustrated in the drawings, a cover layer (not illustrated) may be disposed under the blocking member 270 and the color filter CF. The cover layer (not illustrated) may effectively prevent the color filter CF and the blocking member 270 from moving out of position, effectively prevent a defect, such as an afterimage which may be created during screen driving, by suppressing the contamination of the liquid crystal layer LCL by organic matter such as a solvent introduced from the color filter CF, and/or planarize the surface.

The upper panel may include the common electrode CE disposed on the color filter CF. The common electrode CE may generate an electric field in the liquid crystal layer LCL, together with the pixel electrode PE. In an exemplary embodiment, the upper panel may include an upper alignment layer 260 disposed on the common electrode CE. The upper alignment layer 260 may play the same role as the lower alignment layer 250 described above.

The liquid crystal layer LCL is disposed between the first insulating substrate 210 and the second insulating substrate 220 and controls the intensity of light transmitting therethrough. The liquid crystal layer LCL may include a plurality of liquid crystal molecules LC having dielectric anisotropy. The liquid crystal molecules LC may have negative dielectric anisotropy. Therefore, longitudinal or major axes of the liquid crystal molecules LC may be arranged perpendicular to an applied electric field. However, the invention is not limited thereto. In an alternative exemplary embodiment, the liquid crystal molecules LC may also have positive dielectric anisotropy. In such an embodiment, the longitudinal or major axes of the liquid crystal molecules LC may be arranged in a direction parallel to the applied electric field. Here, the liquid crystal molecules LC may be tilted to a certain degree by the upper alignment layer 260 and the lower alignment layer 250. In such an embodiment, the liquid crystal molecules LC may generally be aligned between the first insulating substrate 210 and the second insulating substrate 200 in a direction perpendicular to the first insulating substrate 210 and the second insulating substrate 220.

When an electric field is applied to between the first insulating substrate 210 and the second insulating substrate 220, the liquid crystal molecules LC are rearranged in a certain direction, and the polarization of light passing through the rearranged liquid crystal molecules LC is changed by optical anisotropy of the rearranged liquid crystal molecules LC. Accordingly, the light may be transmitted or blocked by a polarizing plate (not illustrated) provided on the first insulating substrate 210 and the second insulating substrate 220. Here, the term "rearranged" may denote a state in which the liquid crystal molecules LC is tilted or aligned toward or in a direction perpendicular to the first insulating substrate 210 or the second insulating substrate 220.

The pixel electrode PE may include a plurality of sub-pixel electrodes (SPE_1, SPE_2). In the drawings, a first sub-pixel electrode SPE_1 and a second sub-pixel electrode SPE_2 arranged successively in a vertical direction are illustrated as an example. However, the invention is not limited to this example, and more sub-pixel electrodes may be provided. In such an embodiment, the first and second sub-pixel electrodes SPE_1 and SPE_2 are physically connected to each other to receive a same voltage. In such an embodiment, where the first sub-pixel electrode SPE_1 is physically connected to the drain electrode DE of the switching device Q by the contact hole CH as illustrated in the drawings, a data voltage applied to the drain electrode DE of the switching device Q is provided directly to the first sub-pixel electrode SPE_1. In such an embodiment, since the first sub-pixel electrode SPE_1 and the second sub-pixel electrode SPE_2 are physically connected to each other, the data voltage may also be provided to the second sub-pixel electrode SPE_2.

The first and second sub-pixel electrodes SPE_1 and SPE_2 may have the same structure as each other. However, the invention is not limited thereto, and the first and second sub-pixel electrodes SPE_1 and SPE_2 may be substantially the same in shape but different in the overall ratio. In an alternative exemplary embodiment, the first and second sub-pixel electrodes SPE_1 and SPE_2 may have different structures in a certain area.

In an alternative exemplary embodiment, the pixel electrode PE may include a single sub-pixel electrode.

Each of the first and second sub-pixel electrodes SPE_1 and SPE_2 may have a certain pattern. In such an embodiment, the rearrangement direction of the liquid crystal molecules LC may be different in each area according to the pattern structure of each of the first and second sub-pixel electrodes SPE_1 and SPE_2 that overlap the liquid crystal molecules LC. The different rearrangement direction of the liquid crystal molecules LC in each area may improve lateral visibility. The specific structure of each of the first and second sub-pixel electrodes SPE_1 and SPE_2 and the rearrangement direction of the liquid crystal molecules LC will now be described with reference to FIG. 5.

Figure 5:
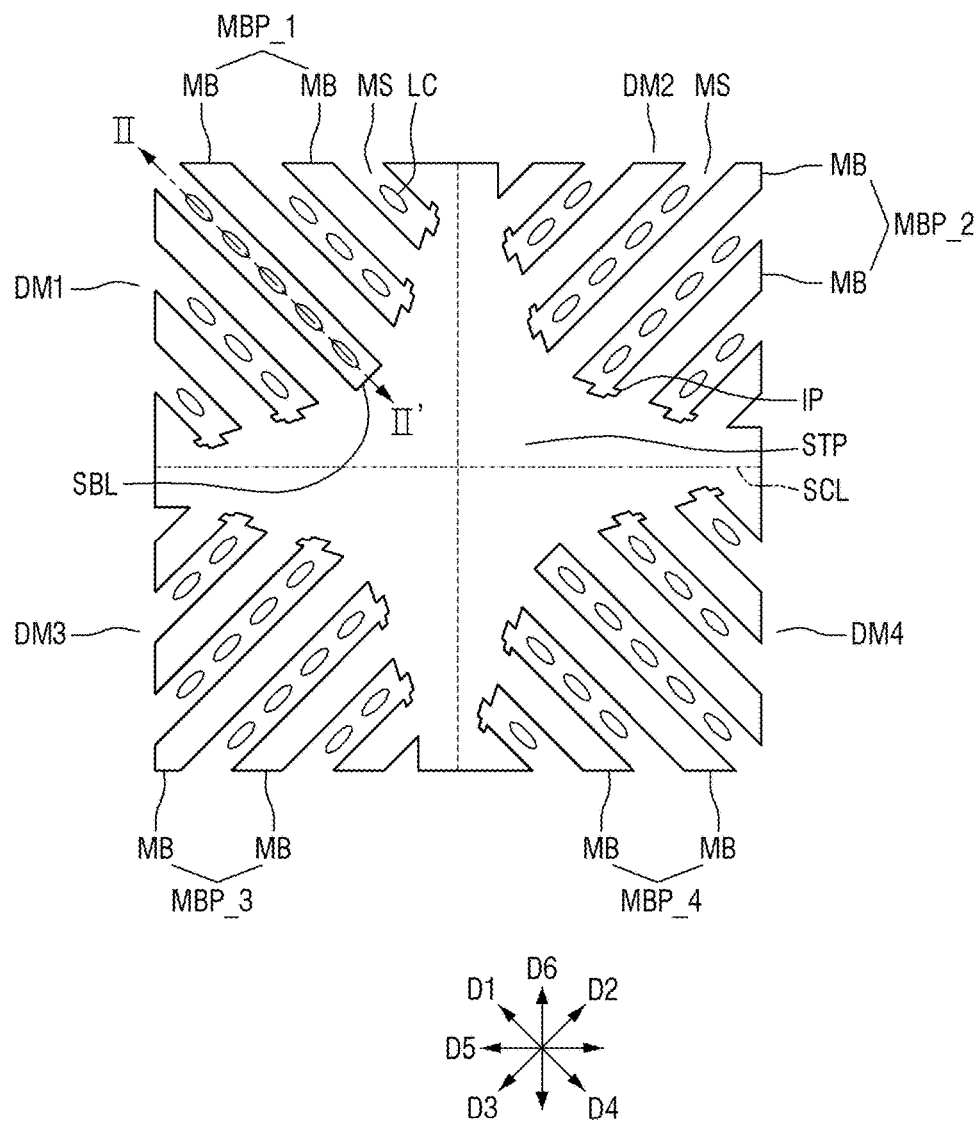
FIG. 5 is a plan view of a sub-pixel electrode according to an embodiment of the invention.

FIG. 5 is a plan view of a sub-pixel electrode SPE according to an embodiment of the invention.

Referring to FIG. 5, an exemplary embodiment of the sub-pixel electrode SPE may include a stem part STP and first through fourth micro-branch parts MBP_1 through MBP_4.

The stem part STP is an area that overlaps an imaginary stem part central line SCL corresponding to a central axis of the sub-pixel electrode SPE in a vertical direction and a horizontal direction. The stem part STP may have substantially a cross-like shape. A data voltage applied to the sub-pixel electrode SPE may be provided to each of the first through fourth micro-branch parts MBP_1 through MBP_4 through the stem part STP.

Each of the first through fourth micro-branch parts MBP_1 through MBP_4 may include micro-branches MB, each branching or extending from the stem part STP in a predetermined direction corresponding to a domain defined thereby. In an exemplary embodiment, an upper left area of the stem part central line SCL that divides the sub-pixel electrode SPE into four quadrants may define a first domain DM1, an upper right area of the stem part central line SCL may define a second domain DM2, a lower left area of the stem part central line SCL may define a third domain DM3, and a lower right area of the stem part central line SCL may define a fourth domain DM4.

For ease of description, a direction toward an upper left corner may be defined as a first direction D1, a direction toward an upper right corner may be defined as a second direction D2, a direction toward a lower left corner may be defined as a third direction D3, and a direction toward a lower right corner may be defined as a fourth direction D4. Here, each of the first through fourth directions D1 through D4 may have an included angle of about 90 degrees with an adjacent direction of the first through fourth directions D1 through D4. In such an embodiment, a direction toward a left side may be defined as a fifth direction D5, and a direction toward an upper side may be defined as a sixth direction D6. Here, the fifth direction D5 forms an included angle of about 45 degrees with the first direction D1 and an included angle of about 90 degrees with the sixth direction D6.

In an exemplary embodiment, the first branch part MBP_1 is disposed in the first domain DM1 and includes micro-branches MB branching from the stem part STP in the first direction D1. In such an embodiment, the micro-branches MB are separated or spaced apart from each other, and micro-slits MS are defined between the micro-branches MB.

In such an embodiment, the second branch part MBP_2 is disposed in the second domain DM2 and includes micro-branches MB branching from the stem part STP in the second direction D2. In such an embodiment, the micro-branches MB are separated or spaced apart from each other, and micro-slits MS are defined between the micro-branches MB.

In such an embodiment, the third branch part MBP_3 is disposed in the third domain DM3 and includes micro-branches MB branching from the stem part STP in the third direction D3. In such an embodiment, the micro-branches MB are separated or spaced apart from each other, and micro-slits MS are defined between the micro-branches MB.

In such an embodiment, the fourth branch part MBP_4 is disposed in the fourth domain DM4 and includes micro-branches MB branching from the stem part STP in the fourth direction D4. In such an embodiment, the micro-branches MB are separated or spaced apart from each other, and micro-slits MS are defined between the micro-branches MB.

Liquid crystal molecules LC disposed above the sub-pixel electrode SPE may be rearranged according to an electric field formed between the sub-pixel electrode SPE and a common electrode CE which faces the sub-pixel electrode SPE.

In such an embodiment, when no electric field is formed between the sub-pixel electrode SPE and the common electrode CE, the liquid crystal molecules LC may be arranged perpendicular to a plane in which the first through sixth directions D1 through D6 are defined.

Here, when an electric field is formed by applying a voltage to the sub-pixel electrode SPE and the common electrode CE, the liquid crystal molecules LC may be rearranged. In an exemplary embodiment, the liquid crystal molecules LC disposed in the first domain DM1 may be rearranged to tilt toward the fourth direction D4, the liquid crystal molecules LC disposed in the second domain DM2 may be rearranged to tilt toward the third direction D3, the liquid crystal molecules LC disposed in the third domain DM3 may be rearranged to tilt toward the second direction D2, and the liquid crystal molecules LC disposed in the fourth domain DM4 may be rearranged to tilt toward the direction D1.

In an exemplary embodiment, the micro-branches MB disposed on both sides of the stem part STP extending along a direction may be arranged alternately. In such an embodiment, since an electric field is formed in each micro-slit MS in a direction oblique to the stem part STP, the control over the liquid crystal molecules LC in an adjacent area may be improved.

In an exemplary embodiment, a slit boundary line SBL at which each micro-slit MS and the stem part STP meet each other may form a particular included angle with the stem part central line SCL. The slit boundary line SBL may be a boundary line between the micro-slit and the stem part STP. The included angle formed by the slit boundary line SBL and the stem part central line SCL may be different in each micro-slit MS. In such an embodiment, an indentation pattern IP defined by a cutout portion extending into the sub-pixel electrode SPE may be formed in an area in which each micro-slit MS is connected to the stem part STP. The included angle formed by the slit boundary line SBL and the stem part central line SCL and the indentation pattern IP formed as described above may improve the control over the liquid crystal molecules LC in an area in which each micro-slit MS is adjacent to the stem part STP. The angle formed by the slit boundary line SBL and the stem part central line SCL and the specific structure of the indentation pattern IP will now be described with reference to FIG. 6.

Figure 6:
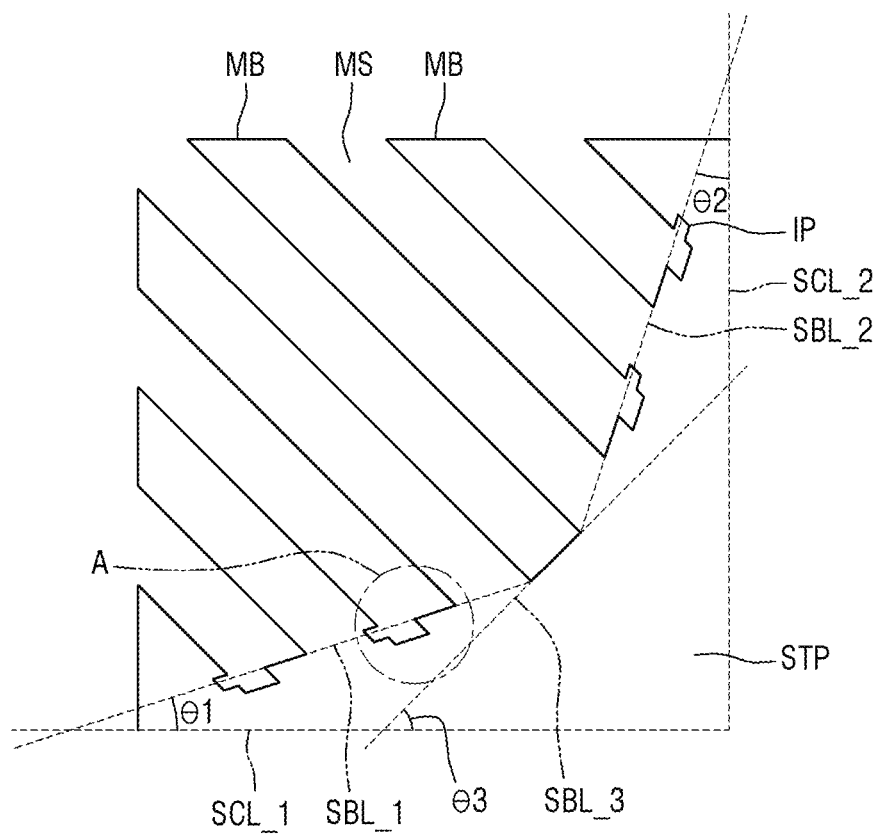
FIG. 6 is an enlarged plan view of a first domain of the sub-pixel electrode of FIG. 5.

FIG. 6 is an enlarged plan view of the first domain DM1 of the sub-pixel electrode SPE of FIG. 5.

Referring to FIG. 6, in an exemplary embodiment, the imaginary stem part central line SCL includes a first stem part central line SCL_1 and a second stem part central line SCL_2, and the slit boundary line SBL includes first through third slit boundary lines SBL_1 through SBL_3.

The first stem part central line SCL_1 denotes a portion of the stem part central line extending horizontally, and the second stem part central line SCL_2 denotes a portion of the stem part central line extending vertically. The first slit boundary line SBL_1 may be a boundary line at which micro-slits MS adjacent to the stem part STP extending horizontally meets the stem part STP. The second slit boundary line SBL_2 may be a boundary line at which micro-slits MS adjacent to the stem part STP extending vertically meets the stem part STP. The third slit boundary line SBL_3 may be a boundary line at which a micro-slit MS formed at a boundary that divides the horizontal direction from the vertical direction of the stem part STP meets the stem part STP.

In such an embodiment, the first slit boundary line SBL_1 and the first stem part central line SCL_1 may form a first angle $\theta1$, and the first angle $\theta1$ may be an acute angle. In one exemplary embodiment, for example, where the first angle $\theta1$ is about 11 degrees, and an improvement in the control over the liquid crystal molecules LC may be maximized.

In such an embodiment, the second slit boundary line SBL_2 and the second stem part central line SCL_2 may form a second angle $\theta2$, and the second angle $\theta2$ may be substantially the same as or equal to about the first angle $\theta1$.

In such an embodiment, the third slit boundary line SBL_3 may form a third angle $\theta3$ with the first stem part central line SCL_1 or the second stem part central line SCL_2, and the third angle $\theta3$ may be about 45 degrees.

In an exemplary embodiment, each micro-slit MS may form a different angle with the first stem part central line SCL_1 or the second stem part central line SCL_2. In such an embodiment, angles other than the first through third angles $\theta1$ through $\theta3$ may be formed, and such angles may all be acute angles.

The indentation pattern IP may be defined or formed in an area in which each micro-slit MS is adjacent to the stem part STP. The indentation pattern IP may be defined by a portion of the micro-slit MS that extends further into the stem part STP.

In exemplary embodiments, the sub-pixel electrode SPE may include the structure in which the slit boundary line SBL and the stem part central line SCL form an acute angle and the structure in which the indentation pattern IP is formed. However, in an alternative exemplary embodiment, the sub-pixel electrode SPE may include only the structure in which the indentation pattern IP is formed to improve the control over the liquid crystal molecules LC.

The shape of the indentation pattern IP will now be described in greater detail with reference to FIG. 7.

Figure 7:
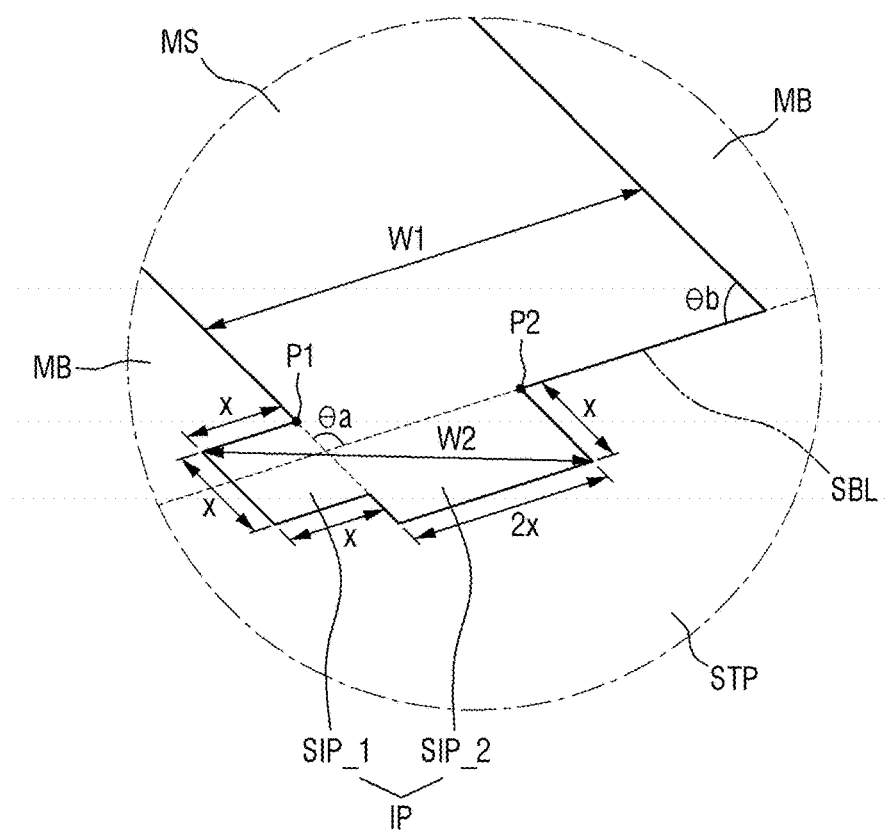
FIG. 7 is an enlarged plan view of an area 'A' of FIG. 6.

FIG. 7 is an enlarged plan view of an area 'A' of FIG. 6.

Referring to FIG. 7, an indentation pattern IP may be formed in such a shape that a micro-slit MS extends into an adjacent micro-branch MB and the stem part STP. In an exemplary embodiment, the indentation pattern IP may include a first sub-indentation pattern SIP_1 and a second sub-indentation pattern SIP_2. Each of the first and second sub-indentation patterns SIP_1 and SIP_2 may be shaped like a parallelogram or have a substantially parallelogrammatic shape. Here, the first sub-indentation pattern SIP_1 may extend parallel to the slit boundary line SBL and may be cut into the stem part STP and the micro-branch MB. The second sub-indentation pattern SIP_2 may extend in a direction parallel to a direction in which the micro-slit MS extends and may be cut into the stem part STP.

When an arbitrary length x is defined as a unit length, each side of the first sub-indentation pattern SIP_1 may have the length of x in an embodiment, as shown in FIG. 7. In such an embodiment, a pair of opposite sides of the second sub-indentation pattern SIP_2 may have the length of x, and the other pair of opposite sides of the second sub-indentation pattern SIP_2 may have a length of 2x. Here, the unit length x may be in a range of about 0.5 µm to about 5 µm, e.g., about 1 µm.

In such an embodiment, when a straight line connecting two points farthest from each other from among points located on an outer side of the indentation pattern IP is defined as a maximum width W2 of the indentation pattern IP, the indentation pattern IP may be formed such that the maximum width W2 of the indentation pattern IP is smaller than a width W1 of the micro-slit MS. In such an embodiment, where the size of the indentation pattern IP is limited as described above, the indentation pattern IP may effectively reinforce the control over the liquid crystal molecules LC in an area in which the micro-slit MS is adjacent to the stem part STP.

In such an embodiment, when two points at which the indentation pattern IP and the micro-slit MS are connected are defined as a first connection point P1 and a second connection point P2, at least one of the first and second connection points P1 and P2 is located on the slit boundary line SBL. In an exemplary embodiment, as shown in FIG. 7, the second connection point P2 is located on the slit boundary line SBL. Accordingly, in such an embodiment, the indentation pattern IP may be formed in the area in which the micro-slit MS is adjacent to the stem part STP and may effectively reinforce the control over the liquid crystal molecules LC in this area.

In an exemplary embodiment, the micro-slit MS is adjacent to the stem part STP and forms two internal angles. When the two internal angles are defined as a first included angle θa and a second included angle θb, respectively, the sum of the first included angle θa and the second included angle θb may be about 180 degrees. Here, if an internal angle formed as an obtuse angle is defined as the first included angle θa and an internal angle formed as an acute angle is defined as the second included angle θb, the indentation pattern IP may be formed adjacent to a vertex at which the first included angle 0a is formed.

In one exemplary embodiment, for example, both of the two internal angles may be about 90 degrees. In such an embodiment, two indentation patterns IP may be formed adjacent to the two internal angles, respectively. Alternatively, no indentation pattern IP may be formed adjacent to both of the two internal angles. In an exemplary embodiment, as shown in FIG. 6, when both of the two internal angles is about 90 degrees, no indentation pattern IP is formed adjacent to both of the two internal angles.

In an exemplary embodiment, as shown in FIG. 7, the indentation pattern IP includes two sub-indentation patterns SIP_1 and SIP_2, and one of the sub-indentation patterns SIP_1 and SIP_2 is cut into the micro-branch MB and the stem part STP, and the other one of the sub-indentation patterns SIP_1 and SIP_2 is cut into the stem part STP. However, the invention is not limited thereto. In an alternative exemplary embodiment, the indentation pattern IP in each micro-slit MS may include only a single sub-indentation pattern or three or more sub-indentation patterns. In an exemplary embodiment, each sub-indentation pattern may be cut into only the micro-branch MB. In such an embodiment, the maximum width W2 of the indentation pattern IP may be smaller than the width W1 of the micro-slit MS, and at least one of the first and second connection points P1 and P2 may be located on the slit boundary line SBL.

In an exemplary embodiment, as illustrated in FIG. 7, each edge of the indentation pattern IP may be parallel to the slit boundary line SBL or each side of the micro-branch MB. However, the invention is not limited to this example. Alternatively, the indentation pattern IP may also include an edge not parallel to the slit boundary line SBL or each side of the micro-branch MB. In an exemplary embodiment, as illustrated in FIG. 7, the indentation pattern IP may include sub-indentation patterns shaped like parallelograms or have a substantially parallelogrammatic shape. However, the shape of each of the sub-indentation patterns is not limited to the parallelogram, and the sub-indentation patterns may have a different shape, e.g., triangles. In an exemplary embodiment, the outer side of the indentation pattern IP may be curved or circular. In such an embodiment, the maximum width W2 of the indentation pattern IP may be smaller than the width W1 of the micro-slit MS, and at least one of the first and second connection points P1 and P2 may be located on the slit boundary line SBL.

An alternative exemplary embodiment, where an indentation pattern has a different shape from that of the indentation pattern IP of FIG. 7 will now be described in detail with reference to FIGS. 8 and 9.

Figure 8:
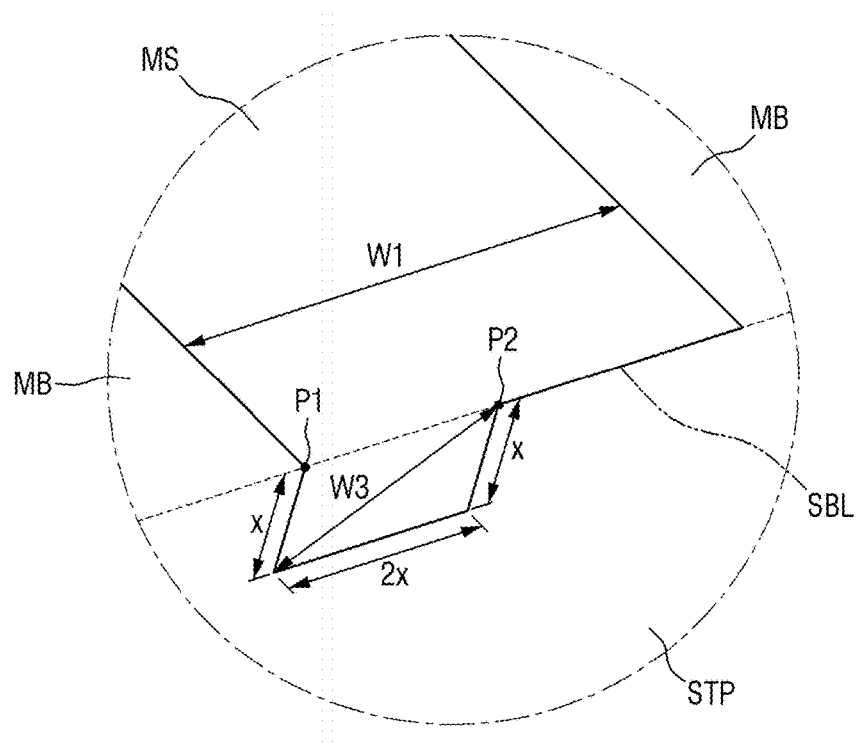
FIG. 8 is an enlarged plan view of an area, which corresponds to the area 'A' of FIG. 6, of a sub-pixel electrode according to another embodiment of the invention.

FIG. 8 is an enlarged plan view of an area, which corresponds to the area 'A' of FIG. 6, of a sub-pixel electrode according to another embodiment of the invention. FIG. 9 is an enlarged plan view of an area, which corresponds to the area 'A' of FIG. 6, of a sub-pixel electrode according to another embodiment of the invention.

Referring to FIG. 8, in an alternative exemplary embodiment, an indentation pattern IP may include only a single sub-indentation pattern shaped like a parallelogram or have a substantially parallelogrammatic shape, and may be cut into only a stem part STP. In such an embodiment, a direction in which the indentation pattern IP extends toward the stem part STP may be different from a direction in which an outer side of a micro-slit MS extends.

In such an embodiment of the indentation pattern IP illustrated in FIG. 8, a maximum width W3 of the indentation pattern IP may be smaller than a width W1 of the micro-slit MS, and at least one of first and second connection points P1 and P2 may be located on a slit boundary line SBL.

Figure 9:
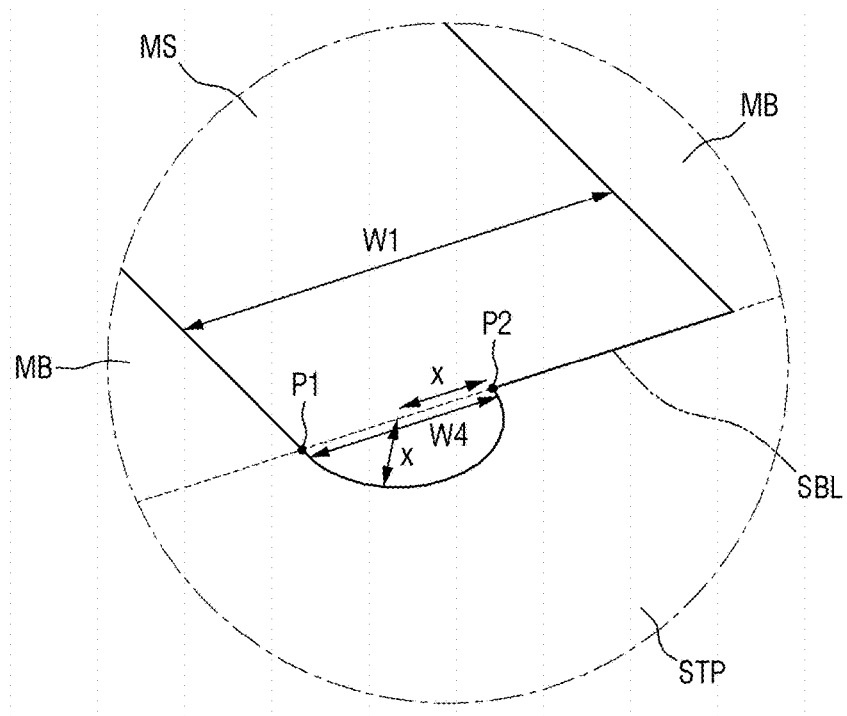
FIG. 9 is an enlarged plan view of an area, which corresponds to the area 'A' of FIG. 6, of a sub-pixel electrode according to another embodiment of the invention.

Referring to FIG. 9, in another alternative exemplary embodiment, an indentation pattern IP may include only a single sub-indentation pattern shaped like a semi-circle and may be cut into only a stem part STP. In such an embodiment, since the indentation pattern IP is semi-circular, an outer side of the indentation pattern IP may be curved, e.g., include a single curve.

In such an embodiment of the indentation pattern IP illustrated in FIG. 9, a maximum width W4 of the indentation pattern IP may be smaller than a width W1 of a micro-slit MS, and at least one of first and second connection points P1 and P2 may be located on a slit boundary line SBL.

Figure 10:
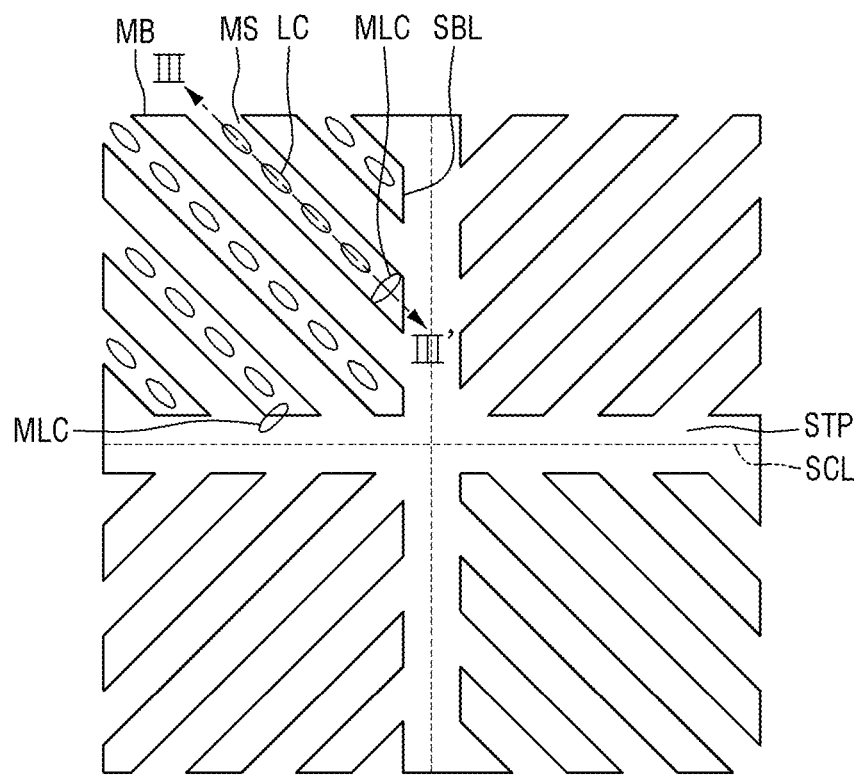
FIG. 10 is a plan view of a sub-pixel electrode according to a comparative embodiment.

FIG. 10 is a plan view of a sub-pixel electrode SPE according to a comparative embodiment.

The sub-pixel electrode SPE shown in FIG. 10 is substantially the same as the sub-pixel electrode SPE shown in FIG. 5 except for some elements thereof The same or like elements shown in FIG. 10 have been labeled with the same reference characters as used above to describe the exemplary embodiments of the sub-pixel electrode SPE shown in FIG.

5, and any repetitive detailed description thereof will hereinafter be omitted or simplified.

Referring to FIG. 10, in a comparative embodiment of the sub-pixel electrode SPE, a slit boundary line SBL and a stem part central line SCL are parallel or perpendicular to each other. In the comparative embodiment, an indentation pattern IP are not be formed in an area in which each micro-slit MS is adjacent to a stem part STP.

In the comparative embodiment, liquid crystal molecules MLC disposed in the area in which each micro-slit MS is adjacent to the stem part STP may tilt in an undesired direction. In the comparative embodiment, liquid crystal molecules disposed in a first domain of the sub-pixel electrode SPE of FIG. 10 may be desired to be rearranged toward a fourth direction D4. However, some liquid crystal molecules MLC disposed in the area in which each micro-slit MS is adjacent to the stem part STP may be rearranged toward a second direction D2 or a third direction D3. In the comparative embodiment the arrangement of the liquid crystal molecules MLC may be irregular or may be rapidly changed, thereby reducing the transmittance of an adjacent area. This will now be described in more detail with reference to FIGS. 11 through 14.

Figure 11:
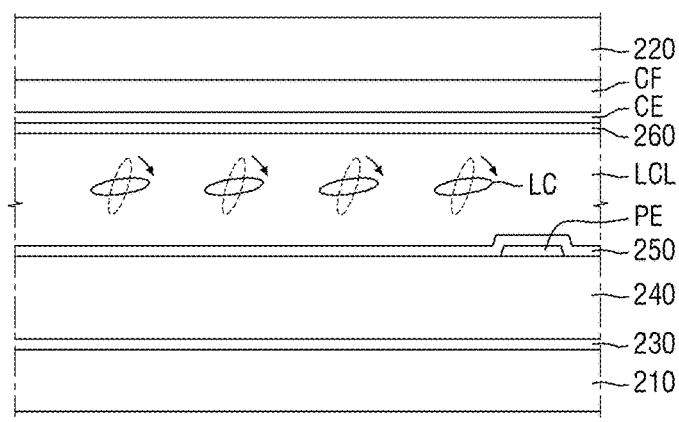
FIG. 11 is a cross-sectional view of an LCD having the sub-pixel electrode of FIG. 5, taken along line II-II'.
Figure 12:
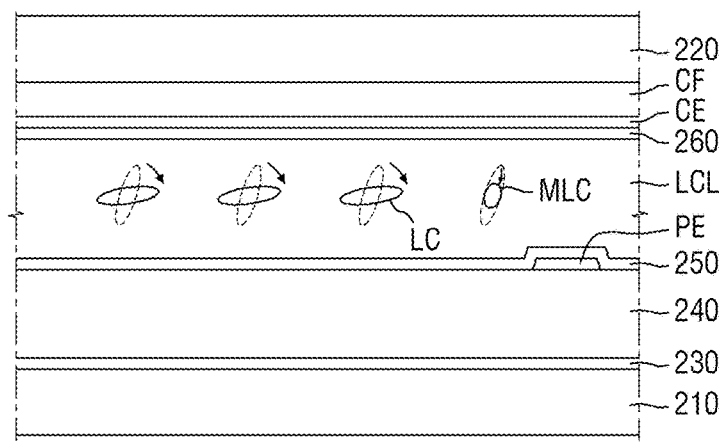
FIG. 12 is a cross-sectional view of an LCD having the sub-pixel electrode of FIG. 10, taken along line III-III'.

FIG. 11 is a cross-sectional view of an LCD having the sub-pixel electrode SPE of FIG. 5, taken along line II-II'. FIG. 12 is a cross-sectional view of an LCD having the sub-pixel electrode SPE of FIG. 10, taken along line III-III'.

Each element illustrated in FIGS. 11 and 12 has been described above with reference to FIG. 4, and thus any repetitive detailed description thereof will be omitted.

Referring to FIG. 11, when no electric field is formed between a pixel electrode PE and a common electrode CE, liquid crystal molecules LC disposed in a liquid crystal layer LCL may be arranged substantially perpendicular to a first insulating substrate 210 or may be slightly tilted from a direction perpendicular to the first insulating substrate 210 by an upper alignment layer 260 and a lower alignment layer 250.

Here, when an electric field is formed between the pixel electrode PE and the common electrode CE, the liquid crystal molecules LC of the liquid crystal layer LCL may all be rearranged to tilt, and the liquid crystal molecules LC disposed along line II-II' of FIG. 5 may all be rearranged to tilt to the right in FIG. 11. This rearrangement and interaction with a polarizing plate (not illustrated) may allow light to be seen.

On the other hand, referring to FIG. 12, when no electric field is formed between a pixel electrode PE and a common electrode CE, the arrangement of liquid crystal molecules LC may be the same as the arrangement of the liquid crystal molecules LC illustrated in FIG. 11. However, when an electric field is formed between the pixel electrode PE and the common electrode CE, some liquid crystal molecules MLC may be rearranged to tilt in an unintended or undesired direction.

When the liquid crystal molecules LC illustrated in FIG. 12 is designed to be rearranged to tilt to the right, some liquid crystal molecules MLC may be rearranged to tilt in a direction perpendicular to the cross-section instead of tilting to the right. In particular, such an error in rearrangement may occur frequently in an area in which each micro-slit MS is adjacent to the stem part STP of the sub-pixel electrode SPE and may reduce the transmittance of the LCD 1000.

Figure 13:
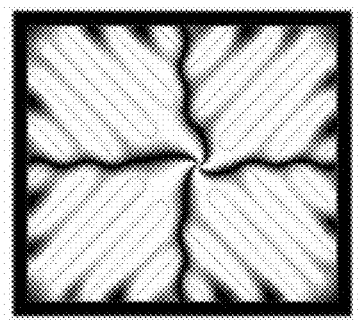
FIG. 13 is an image showing the transmission of light through the sub-pixel electrode of FIG. 5.
Figure 14:
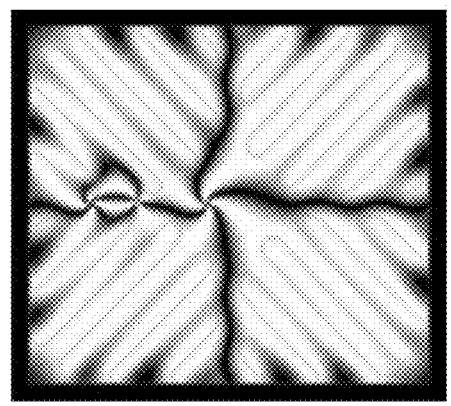
FIG. 14 is an image showing the transmission of light through the sub-pixel electrode of FIG. 10.

FIG. 13 is an image showing the transmission of light through the sub-pixel electrode SPE of FIG. 5, and FIG. 14 is an image showing the transmission of light through the sub-pixel electrode SPE of FIG. 10.

Referring to FIGS. 13 and 14, in the case of the sub-pixel electrode SPE of FIG. 5, the irregularity of light transmission is not observed in the area in which the stem part STP is adjacent to each micro-slit MS. In the case of the sub-pixel electrode SPE of FIG. 10, however, the irregularity of light transmission is observed in the area in which the stem part STP is adjacent to each micro-slit MS. Such irregularity of light transmission may reduce overall transmittance.

In an exemplary embodiment, the irregularity of light transmission in the area in which each micro-slit MS is adjacent to the stem part STP may be prevented by tilting the slit boundary line SBL and the stem part central line SCL and forming the indentation pattern IP.

Figure 15:
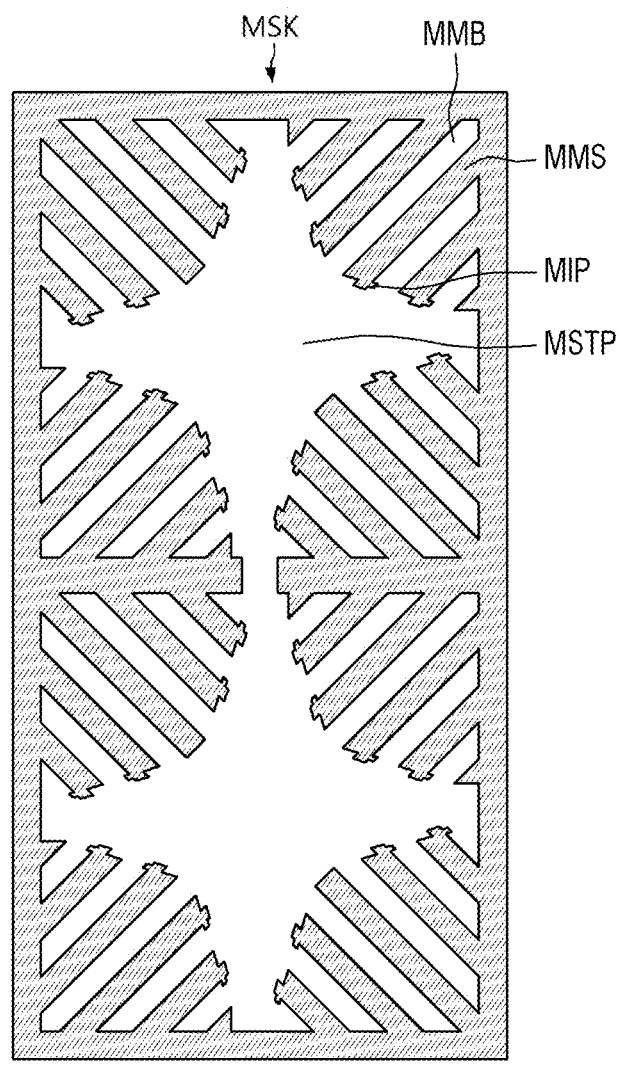
FIG. 15 is a plan view of an exposure mask used to manufacture sub-pixel electrodes according to an embodiment of the invention.

FIG. 15 is a plan view of an exposure mask MSK used to manufacture a sub-pixel electrode according to an embodiment of the invention.

The exposure mask MSK of FIG. 15 is an exemplary embodiment of the exposure mask MSK to be used to manufacture the pixel electrode PE of FIG. 3. For convenience of illustration and description, a pattern of the exposure mask MSK in an area in which a switching device Q is formed is omitted in FIG. 15. The pattern may vary according to the position of the switching device Q.

The exposure mask MSK of FIG. 15 may be used to form a pixel electrode PE including two connected sub-pixel electrodes (SPE_1, SPE_2) as in FIG. 3. The exposure mask MSK of FIG. 15 may correspond to one pixel PX, and a pattern of the exposure mask MSK may be repeatedly defined over the entire exposure mask MSK.

In an exemplary embodiment, the exposure mask MSK of FIG. 15 may be used for photoresist having negative photosensitivity, that is, for photoresist whose portions not irradiated with ultraviolet ("UV") light are removed. In such an embodiment, an area of the exposure mask MS which corresponds to a pixel electrode PE may be transparent and an area excluding the area corresponding to the pixel electrode PE may be opaque.

Although not illustrated in the drawing, in an exemplary embodiment of an exposure mask used for photoresist having positive photosensitivity, that is, for photoresist whose portions irradiated with UV light are removed, an area corresponding to the pixel electrode PE may be opaque, and an area excluding the area corresponding to the pixel electrode PE may be transparent.

In such an embodiment, since the pixel electrode PE is formed according to the pattern of the exposure mask MSK, the exposure mask MSK may include portions corresponding to the micro-branches MB, the stem part STP and the indentation patterns IP of the pixel electrode PE and each sub-pixel electrode SPE of the pixel electrode PE. The specific structures of mask micro-branches MMB, a mask stem part MSTP and mask indentation patterns MIP of the exposure mask MSK may be the same as those of the micro-branches MB, the stem part STP and the indentation patterns IP of each sub-pixel electrode SPE described above.

Here, the micro-branches MB, the micro-slits MS, the stem part STP and the indentation patterns IP of each sub-pixel electrode SPE may correspond to the mask micro-branches MMB, mask micro-slits MMS, the mask stem part MSTP and the mask indentation patterns MIP of the exposure mask MSK, respectively.

An exemplary embodiment of a method of manufacturing a pixel electrode PE using the exposure mask MSK of FIG. 15 will now be described.

FIGS. 16 through 21 are cross-sectional views taken along line IV-IV' of the pixel electrode PE of FIG. 3 showing steps of an exemplary embodiment of a method of manufacturing a pixel electrode.

In FIGS. 16 through 21, a unit process for forming a pixel electrode PE is illustrated. While additional unit processes may be performed to form other elements of an LCD 1000 such as data lines DL and gate lines GL, a description thereof will be omitted.

Figure 16:
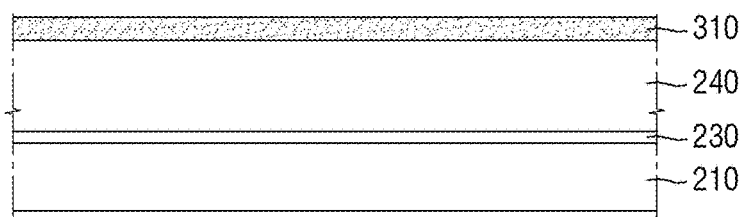
FIGS. 16 through 21 are cross-sectional views taken along line IV-IV' of a pixel electrode of FIG. 3, showing a method of manufacturing a pixel electrode according to an embodiment of the invention.

Referring to FIG. 16, a conductive layer 310 is provided or formed on a surface of a passivation layer 240. The conductive layer 310 may include or be made of a transparent conductive material such as indium zinc oxide ("IZO"). Alternatively, other transparent materials having conductivity may also be used to form the conductive layer 310.

Figure 17:
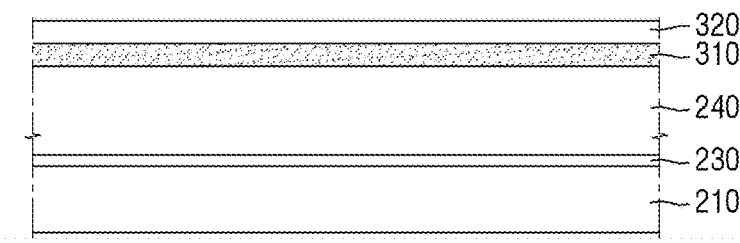

Referring to FIG. 17, a photoresist layer 320 is provided or formed on the conductive layer 310. The photoresist layer 320 may be hardened when irradiated with UV light. Since hardened areas are not removed in a development process, the photoresist layer 320 may protect part of the conductive layer 310 formed thereunder.

As described above, the photoresist layer may have any one of positive photosensitivity and negative photosensitivity. In an exemplary embodiment shown in FIG. 17, the photoresist layer 320 may have negative anisotropy.

Figure 18:
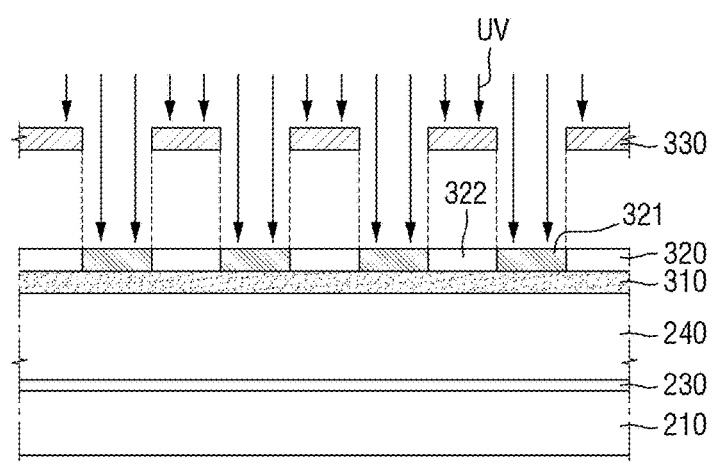

Referring to FIG. 18, UV light is irradiated to a location where a pixel electrode PE is to be formed. Here, an exposure mask 330 may be used to allow the UV light to reach some areas of the photoresist layer 320 and not allow the UV light to reach the other areas of the photoresist layer 320. Accordingly, some areas 321 of the photoresist layer 320 irradiated with the UV light may harden.

The irradiation of UV light may be performed using an exposure device (not illustrated). In an exemplary embodiment, a pattern of the exposure mask 330 and a pattern of the pixel electrode PE may be finer than the limit resolution of the exposure device. In an exemplary embodiment, apart from the resolution of the exposure device, even if UV light is irradiated to the photoresist layer 320 through the exposure mask 330 that blocks some of the UV light, the photoresist layer 320 may be hardened in a partially different pattern from the pattern of the exposure mask 330 due to, e.g., the refraction or diffraction of the UV light. Therefore, the actual shape of the pixel electrode PE formed may be partially different from the shape of the pattern of the exposure mask 330.

Figure 19:
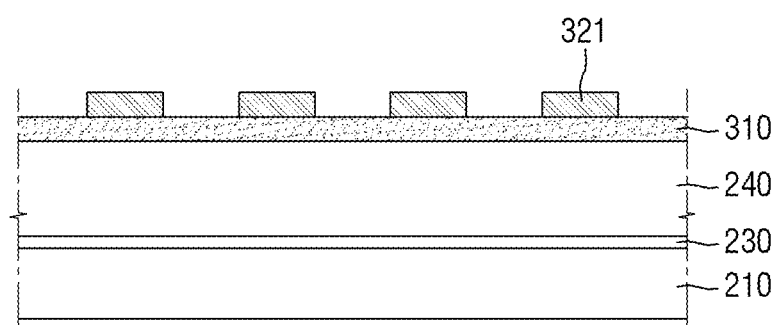

Referring to FIG. 19, a development process is performed to remove areas 322 excluding the hardened areas 321 of the photoresist layer 320.

Figure 20:
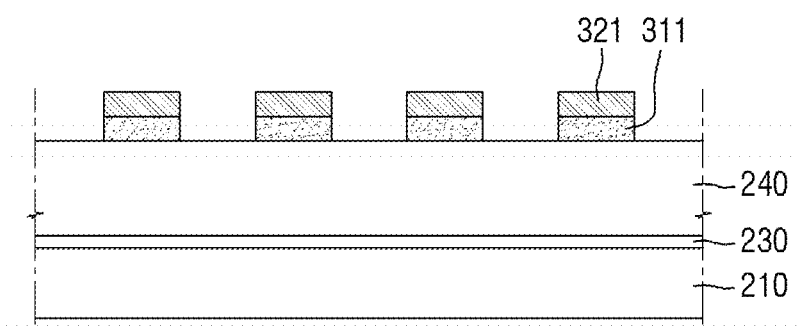

Referring to FIG. 20, the conductive layer 310 excluding areas 311 overlapping or covered by the remaining hardened areas 321 of the photoresist layer 320 is removed by etching.

Figure 21:
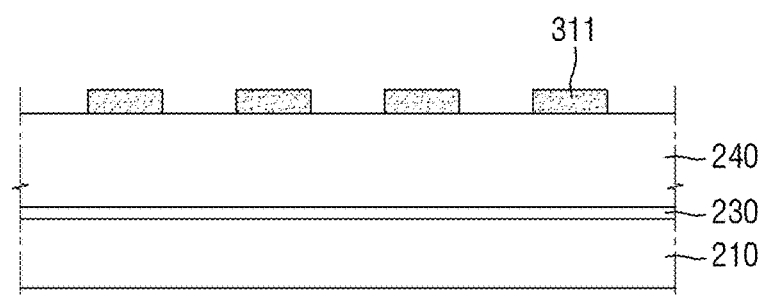

Referring to FIG. 21, the remaining hardened areas 321 of the photoresist layer 320 are removed, thereby obtaining a patterned pixel electrode 311.

Figure 22:
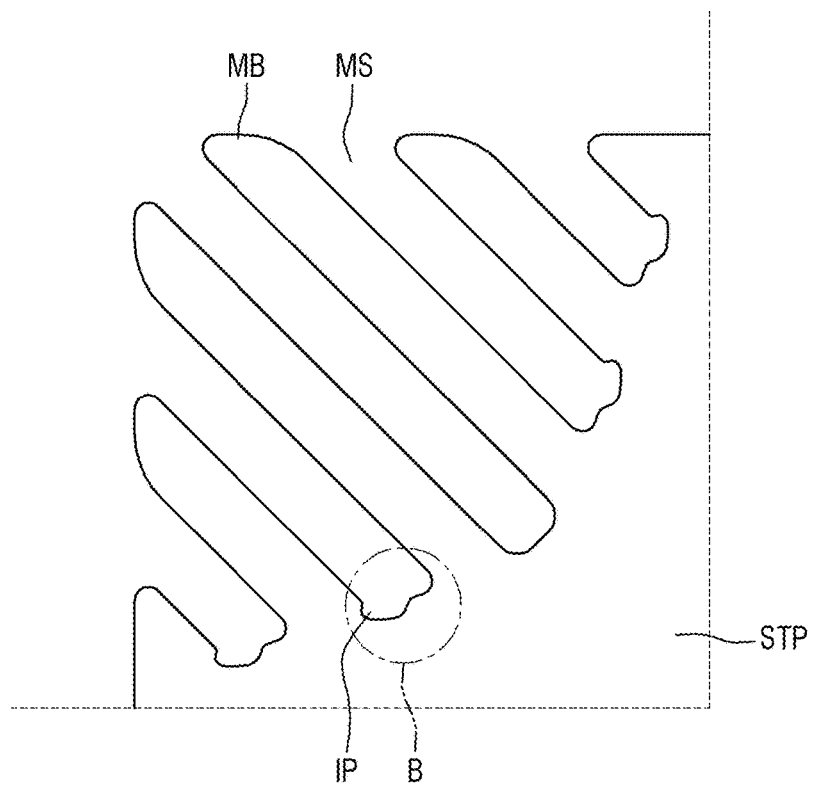
FIG. 22 is a plan view schematically showing an actually manufactured version of the sub-pixel electrode of FIG. 6.

FIG. 22 is a schematic plan view of an actually manufactured version of the sub-pixel electrode SPE of FIG. 6.

Referring to FIG. 22, the output line of an actually manufactured sub-pixel electrode SPE may be different from that of the sub-pixel electrode SPE of FIG. 6 in that each corner of the actually manufactured sub-pixel electrode SPE is gently rounded.

In such an embodiment, since each indentation pattern IP is very small compared with the total size of the sub-pixel electrode SPE of FIG. 22, each corner thereof may be more gently rounded.

Depending on the performance of an exposure device (not illustrated), a sub-pixel electrode SPE may be manufactured in exactly the same shape as the shape of the sub-pixel electrode SPE of FIG. 6.

Figure 23:
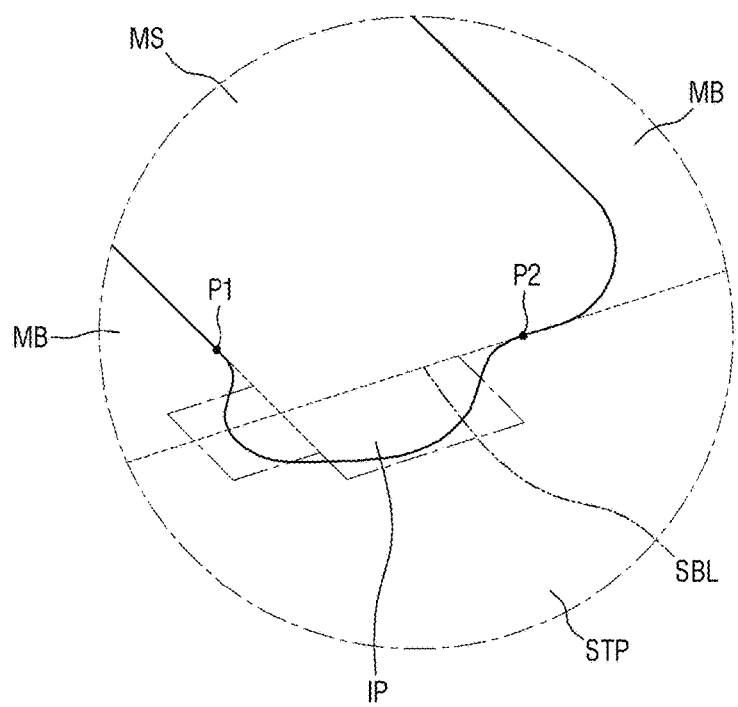
FIG. 23 is an enlarged plan view of an area 'B' of FIG. 22.

FIG. 23 is an enlarged plan view of an area 'B' of FIG. 22.

A two point chain line shown in FIG. 23 corresponds to a pattern of an exposure mask MSK used to manufacture the sub-pixel electrode SPE of FIG. 22.

Referring to FIG. 23, the sub-pixel electrode SPE may include an indentation pattern IP which is cut into a micro-branch MB from an extension line from an edge of the micro-branch MB and cut into a stem part STP from a slit boundary line SBL.

If one sub-pixel electrode SPE includes a plurality of indentation patterns IP, the indentation patterns IP may be different in shape. However, the indentation patterns IP may all be shaped such that a micro-slit MS extends into the micro-branch MB or the stem part STP.

Due to the indentation patterns IP, the control over liquid crystal molecules LC located near the indentation pattern IP may be improved, which, in turn, increases an aperture ratio of the LCD 1000.

According to embodiments of the invention, an LCD having improved control over liquid crystal molecules may be provided.

Further, an exposure mask for manufacturing an LCD having improved control over liquid crystal molecules may be provided.

However, the invention should not be construed as being limited to the exemplary embodiments set forth herein. Rather, these exemplary embodiments are provided so that this disclosure will be thorough and complete and will fully convey the concept of the present invention to those skilled in the art.

While the invention has been particularly shown and described with reference to exemplary embodiments thereof, it will be understood by those of ordinary skill in the art that various changes in form and details may be made therein without departing from the spirit or scope of the present invention as defined by the following claims.

What is claimed is:

1. A liquid crystal display comprising:
   a substrate; and
   a pixel electrode disposed on the substrate,
   wherein the pixel electrode comprises:
   a plurality of micro-branches which are spaced apart from each other and extend side by side with each other, wherein a micro-slit is defined between the micro-branches;
   a stem part which is connected to each of the micro-branches, wherein an indentation pattern is defined by a cutout portion cut into the stem part,
   wherein at least one of two points connecting the indentation pattern and the micro-slit is located on a slit boundary line at which the micro-slit and the stem part meet each other,
   wherein a direction in which the stem part extends and a direction in which the slit boundary line extends are not parallel to each other, and
   wherein an angle formed by the direction in which the stem part extends and the direction in which the slit boundary line extends is greater than about 10 degrees and smaller than about 15 degrees.

2. The liquid crystal display of claim 1, wherein
   a maximum width of the indentation pattern, which is a length of a straight line connecting two points located farthest from each other from among points located on an outer side of the indentation pattern, is smaller than a width of the micro-slit.

3. The liquid crystal display of claim 1, wherein
the indentation pattern comprises a first sub-indentation pattern and a second sub-indentation pattern,
each of the first and second sub-indentation patterns is cut into the stem part or a micro-branch.

4. The liquid crystal display of claim 3, wherein each of the first and second sub-indentation patterns has a substantially parallelogrammatic shape.

5. The liquid crystal display of claim 4, wherein
the first sub-indentation pattern extends parallel to the slit boundary line and is cut into the stem part and the micro-branch, and
the second sub-indentation pattern extends parallel to a direction in which the micro-slit extends and is cut into the stem part.

6. The liquid crystal display of claim 1, wherein the indentation pattern is semi-circular.

7. The liquid crystal display of claim 1, wherein
the micro-slit has a first angle and a second angle, which are two internal angles formed with respect to the stem part,
the first angle is an obtuse angle,
the second angle is an acute angle, and
the indentation pattern is disposed adjacent to a vertex at which the first angle is formed.

8. The liquid crystal display of claim 1, wherein
the pixel electrode comprises a plurality of domains,
wherein a direction in which the micro-branches and the micro-slit extend is different in each of the domains.

9. The liquid crystal display of claim 1, wherein the outer side of the indentation pattern comprises a single curve.

10. An exposure mask comprising:
a blocking area which blocks incident light;
a transmitting area which is adjacent to the blocking area and transmits the incident light therethrough,
wherein the transmitting area comprises:
a plurality of mask micro-branches which are separated from each other and extend side by side with each other;
a mask micro-slit defined between the mask micro-branches;
a mask stem part connected to each of the mask micro-branches; and
a mask indentation pattern defined by a cutout portion extending into the mask stem part,
wherein at least one of two points connecting the mask indentation pattern and the mask micro-slit is located on a mask slit boundary line at which the mask micro-slit and the mask stem part meet each other,
wherein a direction in which the mask stem part extends and a direction in which the mask slit boundary line extends are not parallel to each other, and
wherein an angle formed by the direction in which the mask stem part extends and the direction in which the mask slit boundary line extends is greater than about 10 degrees and smaller than about 15 degrees.

11. The exposure mask of claim 10, wherein
a maximum width of the mask indentation pattern, which is a length of a straight line connecting two points located farthest from each other from among points located on an outer side of the mask indentation pattern, is smaller than a width of the mask micro-slit.

12. The exposure mask of claim 10, wherein
the mask indentation pattern comprises a first sub-mask indentation pattern and a second sub-mask indentation pattern,
wherein each of the first and second sub-mask indentation patterns is cut into the mask stem part or a mask micro-branch.

13. The exposure mask of claim 12, wherein each of the first and second sub-mask indentation patterns has a substantially parallelogrammatic shape.

14. The exposure mask of claim 13, wherein
the first sub-mask indentation pattern extends parallel to the mask slit boundary line and is cut into the mask stem part and the mask micro-branch, and
the second sub-mask indentation pattern extends parallel to a direction in which the mask micro-slit extends and is cut into the mask stem part.

15. The exposure mask of claim 10, wherein
the mask micro-slit has a first angle and a second angle which are two internal angles thereof formed with respect to the mask stem part,
the first angle is an obtuse angle,
the second angle is an acute angle, and
the mask indentation pattern is disposed adjacent to a vertex at which the first angle is formed.

16. The exposure mask of claim 10, further comprising:
a plurality of domains, wherein a direction in which the mask micro-branches and the mask micro-slit extend is different in each of the domains.

* * * * *